(12) United States Patent
Anker et al.

(10) Patent No.: US 8,652,604 B2
(45) Date of Patent: Feb. 18, 2014

(54) LOW MIGRATION POLYOLEFIN COMPOSITION

(75) Inventors: Martin Anker, Hisings Kärra (SE); Svein Jamtvedt, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 1092 days.

(21) Appl. No.: 12/443,655

(22) PCT Filed: Sep. 28, 2007

(86) PCT No.: PCT/EP2007/008478
§ 371 (c)(1),
(2), (4) Date: Nov. 3, 2009

(87) PCT Pub. No.: WO2008/040501
PCT Pub. Date: Apr. 10, 2008

(65) Prior Publication Data
US 2010/0143631 A1  Jun. 10, 2010

(30) Foreign Application Priority Data
Oct. 4, 2006  (EP) .................................. 06020873

(51) Int. Cl.
*B32B 1/08* (2006.01)
*B32B 23/00* (2006.01)

(52) U.S. Cl.
USPC ....... 428/36.9; 428/34.1; 428/34.2; 428/35.7; 428/35.9

(58) Field of Classification Search
USPC ..................... 428/34.1, 34.2, 35.7, 35.9, 36.9
See application file for complete search history.

(56) References Cited

U.S. PATENT DOCUMENTS

| | | | |
|---|---|---|---|
| 5,102,611 A | 4/1992 | Wolfe et al. | |
| 5,266,616 A | 11/1993 | Wolfe | |
| 6,511,724 B1 * | 1/2003 | Siour et al. | ................. 428/36.91 |
| 6,680,351 B1 | 1/2004 | Russell et al. | |
| 7,250,473 B2 * | 7/2007 | Schramm et al. | ............. 525/240 |
| 2002/0040081 A1 | 4/2002 | Stein et al. | |
| 2003/0158306 A1 * | 8/2003 | Battiste et al. | ................. 524/128 |
| 2003/0162868 A1 | 8/2003 | Stretanski et al. | |

FOREIGN PATENT DOCUMENTS

| | | |
|---|---|---|
| GB | 2305180 | 4/1997 |
| WO | 0001765 | 1/2000 |
| WO | 2004033545 | 4/2004 |
| WO | 2005014706 | 2/2005 |

* cited by examiner

*Primary Examiner* — Marc Patterson
(74) *Attorney, Agent, or Firm* — Roberts Mlotkowski Safran & Cole, P.C.

(57) ABSTRACT

The present invention relates to a composition comprising: a) a polyolefin (A); b) a compound (B) according to formula (I), wherein R and R' each is the same or different residue and comprising at least 6 C-atoms; c) a phenolic compound (C), having the formula (II) wherein R is an non-substituted or substituted aliphatic or aromatic hydrocarbyl radical which may comprise heteroatoms, or R is an heteroatom; X is H, OH, and/or R'; whereby R' is a hydrocarbyl radical or hydrogen, and n is 1 to 4; and d) optionally, an UV-light stabilizer (D), wherein for the composition the total amount of migrated compounds (B), (C) and, if present, (D), as well as their decomposition products is equal to or less than 1.8 microgram per liter with a ratio S/V dm$^{-1}$ of 11.70 to 12.30, to the use of said composition for the production of a pipe and to a pipe comprising said composition.

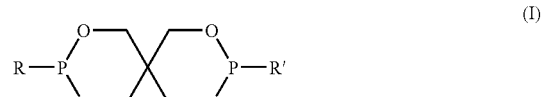

(I)

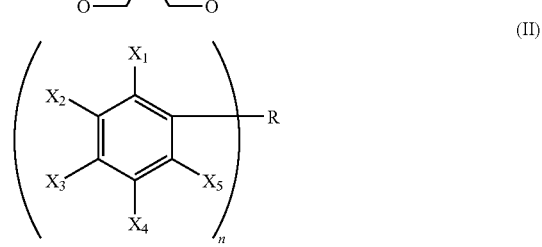

(II)

9 Claims, No Drawings

LOW MIGRATION POLYOLEFIN COMPOSITION

The present invention relates to a polyolefin composition wherein the migration of the used additives in the composition is low and thus the composition is particularly suitable for pipe applications.

Recent progress in the manufacturing and processing of polymers have led to the application of plastics in virtually every aspect of modern day life. However, polymeric compounds are prone to aging under the effects of light, oxygen and heat. This results in a loss of strength, stiffness and flexibility, discoloration and scratching as well as loss of gloss.

Polymeric compounds, for example polyolefins like polyethylene and polypropylene, undergo radical driven degradation processes especially during processing steps which might include moulding, extrusion, etc. However, degradation even proceeds during end-use by a radical mechanism under the influence of light or heat and will finally destroy the polymer properties.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Typically, modifiers are anti-static and anti-fogging agents, acid scavengers, blowing agents, lubricants, nucleating agents, slip and anti-blocking agents, as well as fillers, flame retardants and cross-linkers.

Stabilizers, like antioxidants, traditionally and currently used comprise sterically hindered phenolics, aromatic amines, organophosphites/phosphonites and thioethers. However, appropriate combinations of stabilizers have to be carefully selected, depending on the desired final properties, the polymeric article should have.

In WO 2004/033545, antioxidant compositions are disclosed for improving long-term heat stability of polymeric materials.

Besides many other applications, polyolefins are used for the preparation of pipes for drinking water distribution systems. Due to the permanent contact to the inner pipe surface, compounds can migrate from the pipe material into the water, thereby deteriorating its quality. The admissible amounts of harmful compounds within the drinking water are fixed by legal requirements and even stricter requirements are to be expected with the introduction of the so-called "European acceptance scheme".

Migration behavior of stabilizers and modifiers added to polyolefin-based materials is dependent from a number of different properties such as diffusion rate of the molecules within the polymer matrix, chemical stability of the additives, type of additive decomposition products, etc. To give an example, a specific additive compound might have improved chemical stability, thereby having a beneficial effect on migration behavior, but might, on the other hand, decompose into compounds easily diffusing through the polymer matrix, thereby having a detrimental effect on migration behavior. Furthermore, it has to be taken into account that an improvement in migration behavior must not be obtained on the expense of stabilization of the polymer matrix. Thus, providing an additive composition of low migration tendency, is not straight-forward but rather needs a careful selection of appropriate compounds.

GB 2 305 180 discloses polyolefin compositions which are in permanent contact with an extracting media, these compositions further comprising organic phosphites/phosphonites, phenolic compounds or sterically hindered amines as stabilizing components.

However, to further improve drinking water quality and considering stricter legal requirements to be expected in the near future, it is still highly appreciated to provide pipes of high thermal and chemical stability and releasing only very small amounts of additives into the water.

Thus, it is an object of the present invention to provide a composition which has a low migration tendency of additives and their decomposition products, in particular of phenolic compounds and light stabilizer, without losing the stability.

The present invention is based on the finding that the object of the invention can be achieved, if the polymer composition comprises a specific combination of additives.

Therefore, the present invention relates to a composition comprising
a) a polyolefin (A);
b) a compound (B) according to formula (I):

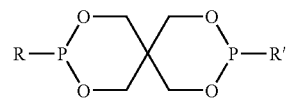

I wherein R and R' each is the same or different residue and comprising at least 6 C-atoms;
c) a phenolic compound (C), having the formula (II)

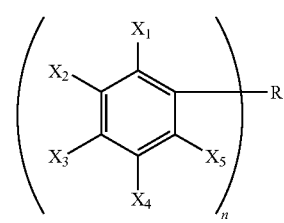

II wherein R is an non-substituted or substituted aliphatic or aromatic hydrocarbyl radical which may comprise heteroatoms, or R is an heteroatom; $X_1$ to $X_5$ each is H, OH, and/or R'; whereby R' is a hydrocarbyl radical or hydrogen, and n is 1 to 4; and
d) optionally, an UV-light stabilizer (D),
wherein for the composition the total amount of migrated compounds (B), (C) and, if present, (D), as well as their decomposition products is equal to or less than 1.8 microgram per liter with a ratio S/V $dm^{-1}$ of 11.70 to 12.30, determined according to the description on page 8 to 9.

Due to their bulky structure the migration rate of the additives within the polyolefin matrix is significantly reduced, whereas chemical stability, in particular hydrolytic stability, is improved.

The amount of migrated compounds (B), (C), and, if present, (D), as well as their decomposition products in the composition is equal to or less than 1.8 microgram per liter, more preferably less than 1.5 microgram per liter, still more preferably less than 1.2 microgram per liter and most preferably less than 1.0 microgram per liter with a ratio S/V $dm^{-1}$ of 11.70 to 12.30, measured as described on page 8 to 9. The quantification is made with the GC-MS.

The formed decomposition products depend on the used additive compounds of the composition. In the present invention, possible decomposition products of the used components are substituted and/or unsubstituted phenols, alkene dione, benzoquinone, benzylaldehyde, aromatic and/or aliphatic carboxylic esters, amides, and the like.

In the present invention it is preferred that in formula (I) of compound (B) R and R' each is the same or different residue and comprising preferably at least 10 C-atoms, and most preferably they are a substituted phenyl residue comprising at least one tert.-butyl group or a linear hydrocarbyl group comprising at least 10 C-atoms. In an preferred embodiment of the present invention compound (B) is Bis(2,4-dicumylphenyl) pentaerythritol-di-phosphite.

Furthermore, compound (B) is preferably used in an amount of equal to or less than 0.5 wt %, more preferably less than 0.2 wt %, most preferably less than 0.1 wt %, based on the total composition.

It is also preferred that the phenolic compound (C) has the formula IIa

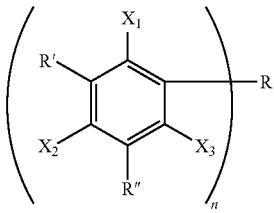

wherein R is an non-substituted or substituted aliphatic or aromatic hydrocarbyl radical which may comprise heteroatoms, or R is a heteroatom; R' is a hydrocarbyl radical or hydrogen, R" is a hydrocarbyl radical or hydrogen, $X_1$, $X_2$ and $X_3$ is the same or different H or OH, whereby at least $X_1$, $X_2$ or $X_3$ is OH, and n is 1 to 4.

The "hydrocarbyl radical" of formula II and IIa preferably is a substituted or non-substituted $C_1$ to $C_{50}$ hydrocarbyl group, which may be linear, cyclic, or aromatic, and may comprise heteroatoms. The heteroatoms may be oxygen, sulphur, nitrogen, phosphorus or the like.

Furthermore, it is preferred that the hydrocarbyl radical is a bulky radical, which means that the above mentioned hydrocarbyl radical further comprises a sterically hindered group. The sterically hindered group are preferably selected from the group of un-substituted or substituted aliphatic, cyclic or aromatic $C_1$ to $C_{50}$ hydrocarbyl groups, which may comprise heteroatoms. More preferably the sterically hindered group is selected from the group of iso-propyl, tert.-butyl-, un-substituted and substituted phenyl, piperidine, and/or triazine and the like.

If R of formula II and IIa is a heteroatom, it is preferred that R is sulphur.

It is even more preferred that the phenolic compound (C) is selected from the group comprising Bis(3,3-bis(4'-hydroxy-3'-tert.-butylphenyl)butanoic acid)glycolester (Hostanox O3™) 1,3,5-trimethyl-2,4,6-tris(3,5-di-tert.-butyl-4-hydroxyphenyl)benzene (Ethanox 330™), Pentaerythrityl-terakis (3-(3',5'-di-tert. Butyl-4-hydroxyphenyl)-propionate (Irganox 1010™), a butylated reaction product of p-cresol and dicyclopentadiene (Ionol LC™), or a mixture thereof.

The used amount of phenolic compound (C) preferably is 0.05 wt % or more, and more preferably 0.1 wt % or more, based on the total composition. The upper limit of the used amount preferably is equal to or less than 1 wt %, more preferably equal to or less than 0.5 wt %, based on the total composition.

The UV-light stabilizer (D) preferably comprises a sterically hindered amine. Conventional sterically hindered amines working as UV-light stabilizer (frequently abbreviated as HALS: hindered amine light stabilizer) known in the art can be used, e.g. in WO 2005/014706 suitable sterically hindered amine are disclosed.

In the present invention it is preferred that the sterically hindered amine comprises one or more groups of the following formula

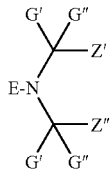

wherein G' and G" are the same or different alkyl residues, Z' and Z" are the same or different alkyl residues, or Z' and Z" together form a linking moiety which may additionally be substituted by an ester, ether, amide, amino, carboxy or urethane group, and E is oxyl, hydroxyl, alkoxy, cycloalkoxy, aryloxy or alkyl residue or hydrogen.

In a preferred embodiment, the sterically hindered amine is a polymer of 2,2,4,4-tetramethyl-7-oxa-3,20-diaza-20-(2,3-epoxy-propyl)dispiro-(5.1.11.2)-heneicosan-21-one and epichlorohydrine.

The UV-light stabilizer is preferably used in an amount of 0.01 to 1 wt %, more preferred of 0.05 to 0.5 wt %, based on the total composition.

In another preferred embodiment carbon black is used as an further UV-light stabilizer. In this embodiment carbon black preferably is used in an amount from 0.2 to 3.5 wt %, more preferably from 1.0 to 3.5 wt %, and most preferably from 2.0 to 3.0 wt %, based on the total composition.

It is also preferred in the present invention that the polyolefin (A) is an ethylene homo- or copolymer or a propylene homo- or copolymer. Most preferably, the polyolefin is an ethylene homo- or copolymer.

The polyolefin (A) can be obtained by any method known in the art.

Of course, when using the inventive composition, further compounds selected from conventional additives, fillers, minerals and lubricants may be added for improving processability and surface characteristics thereof.

The composition of the present invention is preferably used in pipes—black as well as natural (i.e. non-colored) or colored pipes.

Preferably, such a pipe is used in a drinking water supply system. As it is shown below the use of the inventive composition in water pipes leads to a reduction of migration of additives and decomposition products thereof into water being in contact with said pipe.

Measurement Methods a) Migration and Quantification of the Additives and Decomposition Products Pipe samples were leached with unchlorinated water according to EN-12873-1 at room temperature (23° C.). The third migration water was analyzed for content of organic compounds. Water samples were extracted to methylene chloride, isotopically marked internal standards were added to the water before extraction. After concentration of the extracts, injection standard was added, and the extracts were analyzed by gas chromatography with mass selective detector according to EAS-GCMS (EAS=European Acceptance Scheme) test method (draft). As procedural blank, Milli-Q water stored in acid washed glassware under the same time periods as leaching tests, was extracted to methylene chloride and all standards were added as described in the test method.

The ratio of the surface area (S) of the test piece intended to come into contact with test water to volume (V) of the test water shall be expressed per decimeter, i.e. $dm^{-1}$ (which is $dm^2/dm^3$ or $dm^2$/liter). Surface-to-volume (S/V) ratio should be in the range of 5 $dm^{-1}$ to 40 $dm^{-1}$. In the present invention the ratio S/V was 11.70 to 12.30 $dm^{-1}$.

The deuterated internal standards were added to migration water prior to extraction in order to calculate the concentrations of the leached organic compounds. The recoveries, e.g. ratio between the amount of internal standard added to migration water to the amount found in extracts (in %) of the internal standards naphthalene-$d_8$, phenanthrene-$d_{10}$ and squalane-$d_{62}$ must be above 50% for satisfactory method performance.

The concentrations were then calculated according to $$[D]=AD/A1\times[I]$$

where
[D] is the concentration of a compounds D (in µg/liter);
AD is the peak area of compound D;
A1 is the peak area of the internal standard;
[I] is the concentration of the internal standard (in µg/liter)

EXAMPLES

The polyolefin (A) used as base polymer in all examples is a bimodal high density polyethylene (ref. EP 1095102 B1, Example 1) produced in Borealis Borstar plants and the 32×3 mm (outer diameter×wall thickness) pipes have been prepared by extrusion.

In the inventive and comparative examples the following components are used.

Compound (B):
Bis(2,4-dicumylphenyl)pentaerythriol diphosphite (Doverphos S-9228™) commercially available from Dover Chemical Corp.
Tris(2,4-di-t-butylphenyl)phosphite (Irgafos 168™) commercially available from Ciba Speciality Chemical Phenolic Compound (C):
Pentaerythrityl-terakis(3-(3',5'-di-tert. Butyl-4-hydroxyphenyl)-propionate (Irganox 1010™) commercially available from Ciba Speciality Chemicals,
1,3,5-Tri-methyl-2-4,6-tris-(3,5-di-tert. butyl-4-hydroxy phenyl benzene (Ethanox 330™) commercially available from Albermare or,
Bis-(3,3-bis-(4'-hydroxy-3'-tert. butylphaneyl)butanic acid)-glycol-ester (Hostanox O3™) commercially available from Clariant.

UV-Light stabilizer (D):
Dimethyl succinate polymer with 4-hydroxy-2,2,6,6-tetramethyl-1-piperidine ethanol (Tinuvin 622™) commercially available from Ciba Speciality Chemical or
a polymer of 2,2,4,4-tetramethyl-7-oxa-3,20-diaza-20-(2,3-epoxipropyl)dispiro-(5.1.11.2)-heneicosane-21-one and epochlorohydrine (Hostavin N30™) commercially available from Clariant.

The following compositions were tested:

TABLE 1

Composition used in black high density polyethylene pipes

| Additives | Example 1 (comparative) amount of additive [wt %] | Example 2 (inventive) amount of additive [wt %] | Example 3 (inventive) amount of additive [wt %] |
|---|---|---|---|
| Irgafos 168 | 0.11 | — | — |
| Doverphos S-9228 | — | 0.05 | 0.05 |
| Irganox 1010 | 0.11 | — | — |
| Hostanox O3 | — | — | 0.10 |
| Ethanox 330 | — | 0.10 | — |
| Hostavin N30 | — | — | 0.10 |

TABLE 2

Composition used in blue high density polyethylene pipes

| Additives | Example 4 (comparative) amount of additive [wt %] | Example 5 (inventive) amount of additive [wt %] |
|---|---|---|
| Irgafos 168 | 0.15 | — |
| Doverphos S-9228 | — | 0.075 |
| Irganox 1010 | 0.15 | — |
| Hostanox O3 | — | — |
| Ethanox 330 | — | 0.10 |
| Tinuvin | 0.25 | — |
| Hostavin N30 | — | 0.15 |

TABLE 3

Test results

| Example | S [dm²] | V [liter] | S/V [dm⁻¹] | migrated decomposition products from (B) and (C) [ppb] | migrated decomposition products from (B), (C) and (D) [ppb] |
|---|---|---|---|---|---|
| Example 1 (comparative) | 11.15 | 0.9115 | 12.23 | 1.9 | |
| Example 2 (inventive) | 11.15 | 0.9236 | 12.07 | 0.8 | |
| Example 3 (inventive) | 11.15 | 0.9146 | 12.19 | 0.9 | |
| Example 4 (comparative) | 11.15 | 0.9513 | 11.72 | | 5.8 |
| Example 5 (inventive) | 11.15 | 0.9408 | 11.85 | | 0.3 |

The invention claimed is:

1. A method for the production of a pipe, comprising forming a drinking water supply system pipe from a composition comprising:
   a) a polyolefin (A);
   b) a compound (B) which is Bis (2,4-dicumylphenyl)pentaerythritol-di-phosphite;

c) a phenolic compound (C), having the formula (II)

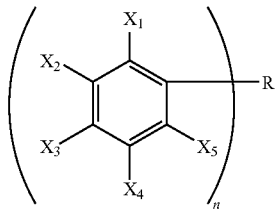

wherein R is an non-substituted or substituted aliphatic or aromatic hydrocarbyl radical which may comprise heteroatoms, or R is an heteroatom; $X_1$ to $X_5$ each is H, OH, and/or R', wherein at least one of which is OH; wherein R' is a hydrocarbyl radical or hydrogen, and n is 1 to 4; and d) optionally, an UV-light stabilizer (D), wherein for the composition a total amount of migrated compounds (B), (C) and, if present, (D), as well as their decomposition products is equal to or less than 1.8 microgram per liter with a ratio S/V $dm^{-1}$ of 11.70 to 12.30.

2. The method according to claim 1, wherein the UV-light stabilizer (D) comprises a sterically hindered amine.

3. The method according to claim 2, wherein the sterically hindered amine comprises one or more groups of the following formula

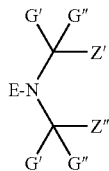

wherein G' and G" are the same or different alkyl residues, Z' and Z" are the same or different alkyl residues, or Z' and Z" together form a linking moiety which may additionally be substituted by an ester, ether, amide, amino, carboxy or urethane group, E is an oxyl, hydroxyl, alkoxy, cycloalkoxy, aryloxy or alkyl residue or hydrogen.

4. The method according to claim 1, wherein the phenolic compound (C) has the formula (II a)

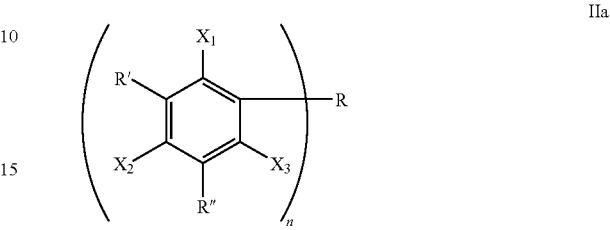

wherein R is a non-substituted or substituted aliphatic or aromatic hydrocarbyl radical which may comprise heteroatoms, or R is a heteroatom; R' is a hydrocarbyl radical or hydrogen, R" is a hydrocarbyl radical or hydrogen, $X_1$, $X_2$ and $X_3$ is the same or different H or OH, wherein at least $X_1$, $X_2$ or $X_3$ is OH, and n is 1 to 4.

5. The method according to claim 1, wherein the amount of compound (B) is equal to or less than 0.2 wt %, based on the total composition.

6. The method according to claim 1, wherein the amount of the phenolic compound (C) is 0.05 wt % or more, based on the total composition.

7. The method according to claim 1, wherein the UV-light stabilizer is used in an amount of 0.01 to 1.0 wt %, based on the total composition.

8. The method according to claim 1, wherein the composition further comprises carbon black.

9. The method according to claim 1, wherein the polyolefin is an ethylene homo- or copolymer or a propylene homo- or copolymer or a mixture thereof.

* * * * *